United States Patent Office 2,911,436
Patented Nov. 3, 1959

2,911,436
METHOD OF PREPARING POLYMERIC PEROXIDES

Alexander A. Miller and Frank R. Mayo, Schenectady, N.Y., assignors to General Electric Company, a corporation of New York No Drawing. Application September 8, 1953
Serial No. 379,062

7 Claims. (Cl. 260—485)

This invention relates to a method of making polymers of vinylidene compounds and oxygen. More particularly, this invention relates to a method of making polymeric peroxides of vinylidene compounds by the reaction of oxygen with aliphatic and aromatic hydrocarbon compounds containing a vinylidene group, in the presence of a free radical catalyst and under suitable pressures.

In this specification and in the appended claims the term "vinylidene" is used to designate compounds containing a $CH_2=C<$ grouping. Such terminology includes both compounds which have a hydrogen on the second carbon atom, i.e., $CH_2=CH-$, and are therefore known specifically as "vinyl compounds" or "acrylates" and those compounds, which contain no hydrogen on the second carbon atom but contain other substituent groups and are therefore known as "α-substituted acrylates" or "vinylidene compounds," i.e., vinylidene chloride.

It is known that polymeric peroxides of vinylidene compounds such as styrene, 1,1-diphenylethylene, methyl methacrylate, and vinyl acetate, are formed by passing oxygen through the respective compounds in bulk or in emulsion. In the case of α-methylstyrene the reaction proceeds as follows:

(I)

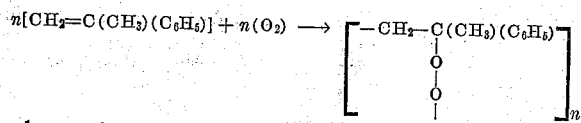

where $n$ is an integer averaging up to about 30 depending on the conditions of the reaction. In addition to the above reaction, when α-methylstyrene is reacted with oxygen, an oxidative decomposition takes place also to give formaldehyde and acetophenone. This oxidative decomposition reaction is typical of vinylidene compounds. This decomposition reaction can be pictured as follows:

(II)

With styrene, the decomposition products formed are formaldehyde and benzaldehyde. With methyl methacrylate, the decomposition products formed are formaldehyde and methyl pyruvate. With n-butyl methacrylate, the decomposition products formed are formaldehyde and n-butyl pyruvate.

The reactions discussed above have three limitations. First, the rate of reaction is extremely slow, second, the desired polymeric peroxide product is contaminated with carbonyl decomposition products, and third, when an emulsion is used, the products are contaminated with the emulsifying agent. Previous workers have found that the rate of absorption of oxygen by vinylidene compounds can be enhanced by the use of free radical catalysts which decompose, to give free radicals. Suitable free radical catalysts are, for example, α,α'-azodiisobutyronitrile, benzoyl peroxide and potassium persulfate.

We have discovered that oxygen pressure has an important effect on the rate of oxygen absorption by vinylidene monomers, and we have also discovered that oxygen pressure has an important part in determining whether the primary reaction products are polymeric peroxides or carbonyl decomposition products. In particular, we have discovered that as the pressure of oxygen used to oxidize the vinylidene monomer is increased, the rate of absorption by the monomer is also increased; that as the pressure of oxygen is increased, the proportion of absorbed oxygen which copolymerizes with the vinyl compound to form the polymeric peroxides increases, while the proportion of the absorbed oxygen which reacts to form the carbonyl decomposition products decreases. It might be expected that the rate of oxygen absorption by the styrene would increase with an increase in pressure. However, the result that the proportion of oxygen absorbed to form the polymeric peroxide increases with oxygen pressure is totally unexpected.

Our invention makes possible the selective production of polymeric peroxides or carbonyls when a vinylidene compound is reacted with oxygen, by selecting the proper pressure of oxygen in the reaction. When an oxygen pressure of less than one atmosphere is desired this may be produced conveniently by mixing oxygen with an inert gas, such as nitrogen, helium, argon, or the like, to produce the desired partial pressure of oxygen. Preferably, the oxidation is carried out in the presence of a free radical catalyst as described above, but the selective effect of the oxygen pressure will be observed even in the absence of such a catalyst.

The following tables show the effects of oxygen pressure on the rates of formation of the polymeric peroxide and the aldehyde decomposition products. In these tables, $P_{O_2}$ is the oxygen pressure in millimeters of mercury unless indicated otherwise, $R_P$ is the rate of formation of polymeric peroxide in mols per liter per hour, $R_K$ is the rate of formation of carbonyl decomposition products in mols per liter per hour based on the vinylidene compound decomposed, $R_{O_2}$ is the rate of oxygen absorption in mols per liter per hour and M.W. is the molecular weight of the polymeric peroxide formed. In the oxidative decomposition of the vinylidene monomer, for each mol of the vinyl monomer, one mol of formaldehyde is formed and also one mol of higher carbonyl is formed. Thus, $R_K$ is the rate of formation of both the formaldehyde and the higher carbonyl.

Table I.—Effects of oxygen pressure on the rates of formation of polymeric α-methylstyrene peroxide and of acetophenone from α-methylstyrene

[50° C., 0.01 m./l. α,α'-azodiisobutyronitrile]

| $P_{O_2}$, mm. Hg | $R_P$, m./l./hr. | $R_K$, m./l./hr. | $R_{O_2}$, m./l./hr. | $R_P/R_K$ | M.W. |
|---|---|---|---|---|---|
| 4.0 atm | 0.115 | 0.031 | 0.146 | 3.7 | |
| 752 atm | 0.072 | 0.048 | 0.120 | 1.5 | |
| 752 atm | 0.067 | 0.050 | 0.117 | 1.3 | 1,930 |
| 190 atm | 0.018 | 0.047 | 0.065 | 0.38 | 1,040 |

Table II.—Effect of oxygen pressure on the rates of formation of polymeric n-butyl methacrylate peroxide and n-butyl pyruvate from n-butyl methacrylate

[65° C., 0.01 m./l. α,α'-azodiisobutyronitrile]

| $P_{O_2}$, mm. Hg | $R_P$, m./l./hr. | $R_K$, m./l./hr. | $R_{O_2}$, m./l./hr. | $R_P/R_K$ | M.W. |
|---|---|---|---|---|---|
| 760 | 0.025 | 0 | 0.025 | | |
| 20 | 0.020 | .006 | 0.026 | 3.3 | 500 |

*Table III.—Effect of oxygen pressure on the rates of formation of polymeric styrene peroxide and benzaldehyde from styrene*

[50° C., 0.01 m./l. α,α′-azodiisobutyronitrile]

| $P_{O_2}$, mm. Hg | $R_P$, m./l./hr. | $R_K$, m./l./hr. | $R_{O_2}$, m./l./hr. | $R_P/R_K$ | M.W. |
|---|---|---|---|---|---|
| 4 atm | 0.059 | (0) | 0.059 | | 3,000 |
| 760 atm | 0.055 | (0) | 0.055 | | |
| 100 atm | 0.047 | 0.010 | 0.057 | 4.7 | |
| 50 atm | 0.030 | 0.015 | 0.045 | 2.0 | |
| 25 atm | 0.021 | 0.023 | 0.044 | 0.91 | |
| 10 atm | 0.016 | 0.016 | 0.032 | 1.0 | |

As shown by Tables I, II and III an increase in oxygen pressure causes an increase in the rate, $R_{O_2}$, of oxygen absorption, an increase in the rate of polymeric peroxide formation, and an increase in the ratio of the rate of polymeric peroxide formation to the rate of carbonyl formation. Applying these data to the oxidation of α-methylstyrene, for example, if the primary oxidation product desired is, for instance, the polymeric peroxide, the oxidation should be carried out at a superatmospheric pressure such as 2 to 6 atmospheres. More particularly the oxidation should be carried out at a pressure of from 3 to 5 atmospheres, and preferably at 4 atmospheres. At this pressure the ratio of polymeric peroxide formation to carbonyl formation is 3.7 so that the primary product would be the polymeric peroxide. If, for example the desired products were the carbonyl decomposition products, the oxygen partial pressure would be kept to a low value, such as 190 millimeters mercury. At this pressure the ratio of acetophenone formed to polymeric peroxide would be about 2.6. This same general teaching of the effective pressure and the preferred range of pressure is also applicable to the peroxidation of n-butyl methacrylate.

The oxidation of the vinylidene monomers may be carried out at a variety of temperatures and with a large range of free radical catalyst concentration. No attempt will be made to define an exact temperature here because the proper temperature will be obvious to a person skilled in the art. Temperatures from room temperature up to about 115° C. may be used, and preferably the temperature is between 50° C. and 95° C. In the selection of the proper temperature, the melting and boiling points of the monomeric vinylidene compound being oxidized should be considered since the oxidation is preferably carried out in a medium of only the liquid vinylidene monomer containing the dissolved free radical catalyst. The thermal decomposition temperature of the polymeric peroxide is another important consideration and, of course, the temperature will have an effect on the rate of reaction. In the oxidation of styrene, for example, a temperature of 50° C. was selected since this temperature is above the melting point of styrene and below the decomposition point of the polymeric styrene peroxide. Temperatures up to about 95° C., where the rate of thermal decomposition of the polymeric styrene peroxide becomes appreciable, could have been used to increase the rate of oxygen absorption. The concentration of the free radical catalyst may be varied from 0.001 up to about 0.2 mol per liter, depending on the economics involved, considering the cost of the catalyst and the increase in reaction rate with the increase in catalyst concentration.

In order that those skilled in the art may better understand the nature of my invention the following examples are given by way of illustration and not by way of limitation.

*Example 1*

10 cc. of α-methylstyrene, containing 0.0164 g. (0.0001 mol) of α,α′-azodiisobutyronitrile as a free radical catalyst, was placed in a pressure vessel. The vessel and contents were heated to 50° C. and the vessel was flushed with pure oxygen. The vessel was then sealed except for an oxygen inlet and the oxygen pressure was increased to and kept at 4 atmospheres while the vessel was rocked at 50° C. for 5 hours. An analysis of the contents of the vessel showed the rate of formation of polymeric α-methylstyrene peroxide to be 0.115 mol per liter per hour, and that of acetophenone to be 0.031 mol per liter per hour.

*Example 2*

A stream of oxygen and nitrogen with the partial pressure of oxygen at 190 mm. Hg (0.25 atm.) was passed over 100 cc. of rapidly agitated α-methylstyrene containing 0.164 gram (0.001 mol) of α,α′-azodiisobutyronitrile at 50° C. Samples were removed periodically for analysis. The peroxide was determined by weighing the precipitated polymer and the acetophenone was determined as the 2,4-dinitrophenylhydrazone. Analysis showed the rate of information of polymeric α-methylstyrene to be 0.018 mol per liter per hour and the rate of formation of acetophenone to be 0.047 mol per liter per hour.

*Example 3*

10 cc. of styrene, containing 0.0164 gram (0.0001 mol) of α,α′-azodiisobutyronitrile, was oxidized at 4.0 atm. oxygen pressure at 50° C. for 5 hours by the method of Example 1. The peroxide content of the sample was determined iodometrically using a constant boiling HI at 100° C. The benzaldehyde content was determined gravimetrically by precipitation as the 2,4-dinitrophenylhydrazone. The rate of formation of polyperoxide in this experiment was 0.059 mol per liter per hour while the rate of formation of benzaldehyde was essentially zero. Thus, at 4 atmospheres, the oxygen in reacting with styrene at 50° C. is converted almost exclusively into the polymeric peroxide.

*Example 4*

Styrene was oxidized under conditions described in Example 2 except that the partial pressure of oxygen was maintained at 25 mm. Hg by mixing oxygen with nitrogen. The rate of formation of polymeric peroxide was now 0.021 mol per liter per hour, while that of benzaldehyde was 0.023 mol per liter per hour. Thus, at oxygen pressure of 25 mm. Hg and a reaction temperature of 50° C. the oxygen is converted to polymeric peroxide and to benzaldehyde in approximately equal proportions.

*Example 5*

A stream of pure oxygen at atmospheric pressure was passed over 100 cc. of rapidly agitated n-butyl methacrylate at 65° C. The n-butyl methacrylate contained 0.001 mol of α,α′-azodiisobutyronitrile. Samples were removed periodically for analysis. The peroxide was determinal iodometrically and the amount of oxygen absorbed was measured. The rate of formation of polymeric n-butyl methacrylate peroxide was 0.025 mol per liter per hour and the rate of formation of n-butyl pyruvate was essentially zero.

*Example 6* n-Butyl methacrylate was oxidized under conditions described in Example 5 except that oxygen pressure was maintained at 20 mm. Hg by dilution with nitrogen. The rate of formation of the peroxide was now 0.020 mol per liter per hour and that of the pyruvate was 0.006 mol per liter per hour.

The polymeric peroxides described here have many uses. They may be directly decomposed by suitable means to form useful carbonyl compounds such as formaldehyde, acetophenone, methyl pyruvate, and the like as is more fully described in applicants' copending application, Serial No. 379,076, now U.S. Patent 2,767,208, filed concurrently herewith and assigned to the same assignee as the present invention. These peroxides also find use as polymerization catalysts for vinyl compounds.

Because of the high oxygen ratio in these compounds, they may be used as vehicles for inorganic materials in coating operations and may then be thermally decomposed to volatile products, leaving a coat of pure inorganic material.

What we claim as new and desire to secure by Letters Patent of the United States is:

1. The method of enhancing the formation of the polymeric peroxide while suppressing the formation of aldehydes and ketones which comprises passing oxygen into a liquid monomer selected from the class consisting of α-methylstyrene and n-butyl methacrylate while maintaining the temperature in the range of from room temperature to 95° C. and the oxygen pressure in the range of 2 to 6 atmospheres during the entire oxidation reaction.

2. The method of claim 1 in which said liquid monomer contains a free radical catalyst.

3. The method of claim 1 in which the oxygen pressure is 4 atmospheres.

4. The method of claim 1 in which the oxygen pressure is 4 atmospheres and the liquid monomer contains a free radical catalyst.

5. The method of enhancing the formation of the polymeric peroxide of α-methylstyrene which while suppressing the formation of formaldehyde and acetophenone comprises passing oxygen into liquid α-methylstyrene while maintaining the temperature in the range of from room temperature to 95° C. and the oxygen pressure at 4 atmospheres.

6. The method of claim 5 in which the α-methylstyrene contains a free radical catalyst.

7. The method of enhancing the formation of the polymeric peroxide of n-butyl methacrylate while suppressing the formation of formaldehyde and n-butyl-pyruvate which comprises passing oxygen into liquid n-butyl methacrylate while maintaining the temperature in the range of from room temperature to 95° C. and the oxygen pressure in the system at about 4 atmospheres.

References Cited in the file of this patent

UNITED STATES PATENTS

| | | |
|---|---|---|
| 2,073,619 | Bauer et al. | Mar. 16, 1937 |
| 2,369,520 | Barnes I | Feb. 13, 1945 |
| 2,381,561 | Staudinger et al. | Aug. 7, 1945 |
| 2,493,343 | Gerhart | Jan. 3, 1950 |
| 2,505,833 | Noether et al. | May 2, 1950 |
| 2,628,178 | Burnett et al. | Feb. 10, 1953 |
| 2,664,447 | Lorand et al. | Dec. 29, 1953 |
| 2,767,208 | Miller et al. | Oct. 16, 1956 |

FOREIGN PATENTS

| | | |
|---|---|---|
| 549,234 | Great Britain | Nov. 12, 1942 |
| 676,770 | Great Britain | Aug. 6, 1952 |

OTHER REFERENCES

Barnes II: "Jr. Am. Chem. Soc.," vol. 67 (1945), pp. 217–20.

Abere et al.: Journal of Applied Chemistry, vol. 1, August 1951, pages 363–370.

Journal of the American Chemical Society, January 1950, pages 210 to 215.

UNITED STATES PATENT OFFICE
CERTIFICATE OF CORRECTION

Patent No. 2,911,436　　　　　　　　　　　　　　　November 3, 1959

Alexander A. Miller et al.

It is hereby certified that error appears in the printed specification of the above numbered patent requiring correction and that the said Letters Patent should read as corrected below.

Column 1, line 70, for "$\alpha,\alpha'$-azodiisobutylro-" read -- $\alpha,\alpha'$-azodiisobutyro- --; column 2, Table I, first column thereof, under the heading "$P_{O_2}$, mm. Hg", after the numerals 752, both occurrences, and 190, each occurrence, strike out "atm"; column 3, Table III, first column thereof, under the heading "$P_{O_2}$, mm. Hg", after the numerals 760, 100, 50, 25, and 10, each occurrence, strike out "atm"; column 4, line 18, for "information" read -- formation --.

Signed and sealed this 17th day of May 1960.

(SEAL)
Attest:

KARL H. AXLINE　　　　　　　　　　　　　　　　　ROBERT C. WATSON
Attesting Officer　　　　　　　　　　　　　　　　Commissioner of Patents